United States Patent [19]

Phipps

[11] 4,364,722

[45] Dec. 21, 1982

[54] FOAM EXTRUSION DIE ASSEMBLY

[75] Inventor: Arthur L. Phipps, Tallmadge, Ohio

[73] Assignee: U.C. Industries, Tallmadge, Ohio

[21] Appl. No.: 250,273

[22] Filed: Apr. 2, 1981

[51] Int. Cl.³ .............................................. B29F 3/04
[52] U.S. Cl. .................... 425/192 R; 264/51;
    264/177 R; 425/461; 425/466; 425/817 C
[58] Field of Search ............... 425/466, 141, 465, 461,
    425/817 C, 4 C, 192 R; 264/51, 177 R, 176 R,
    45.9, 46.1

[56] References Cited

U.S. PATENT DOCUMENTS

| | | | |
|---|---|---|---|
| 1,715,859 | 6/1929 | Norton | 425/466 |
| 2,320,496 | 6/1943 | Wechsler | 425/461 |
| 2,435,426 | 2/1948 | Davies | 425/461 |
| 2,718,661 | 9/1955 | Russell | 425/466 |
| 3,074,106 | 1/1963 | Eberman | 425/461 |
| 3,085,289 | 4/1963 | Van Riper | 425/461 |
| 3,142,090 | 7/1964 | Hoffman et al. | 425/466 |
| 3,195,183 | 7/1965 | Phillips | 425/466 |
| 3,268,950 | 8/1966 | Rankin | 425/466 |
| 3,292,211 | 12/1966 | Strange | 425/466 |
| 3,323,169 | 6/1967 | Vitellard | 425/466 X |
| 3,340,573 | 9/1967 | Sommerfeld | 425/466 |
| 3,385,917 | 5/1968 | Breukink et al. | 264/51 |
| 3,407,441 | 10/1968 | Vigansky et al. | 425/461 |
| 3,525,125 | 8/1970 | Berger et al. | 264/51 X |
| 3,528,128 | 9/1970 | Murakami et al. | 425/464 |
| 3,628,596 | 12/1971 | Easton et al. | 164/82 X |
| 3,632,279 | 1/1972 | Christy et al. | 425/461 X |
| 3,649,147 | 3/1972 | Fritsch | 425/461 |
| 3,813,204 | 5/1974 | Gregory | 425/466 |
| 3,832,427 | 8/1974 | Mutch | 264/177 R |
| 3,850,568 | 11/1974 | Bartha et al. | 425/466 |
| 3,860,383 | 1/1975 | Sirevicius | 425/461 |
| 3,871,812 | 3/1975 | Phipps | 425/466 |
| 3,871,812 | 3/1975 | Phipps | 264/51 X |
| 3,874,981 | 4/1975 | Hayashi et al. | 264/46.1 X |
| 3,985,845 | 10/1976 | Akatsuka et al. | 425/466 X |
| 4,008,036 | 2/1977 | Verlinden et al. | 425/466 |
| 4,071,591 | 1/1978 | Kobayashi et al. | 264/54 X |
| 4,124,351 | 11/1978 | Garbuio | 425/466 X |
| 4,125,350 | 11/1978 | Brown | 425/466 X |
| 4,201,534 | 5/1980 | Phipps | 425/461 |
| 4,292,019 | 9/1981 | Hay et al. | 425/466 |
| 4,295,809 | 10/1981 | Mikami et al. | 425/141 |

FOREIGN PATENT DOCUMENTS

| | | | |
|---|---|---|---|
| 451864 | 10/1948 | Canada | 264/53 |
| 291940 | 7/1965 | Netherlands | 264/51 |

OTHER PUBLICATIONS 1980-1981 Edition of Modern Plastics Encyclopedia, pp. 415-419.
NRM Corporation's Bulletin S-74 Entitled "Flat Sheet Production Lines".

*Primary Examiner*—Jeffery R. Thurlow
*Attorney, Agent, or Firm*—Maky, Renner, Otto & Boisselle

[57] ABSTRACT

A foam extrusion die assembly includes a die body and a pair of spaced cantilevered lip members having opposed lips defining an elongated, arcuate die orifice through which extrudate moves both laterally and axially outwardly relative to the lip members. Each lip member further has an axially extending flexible leg and a foot at the end of the leg opposite the lip. Each foot is adjustably and sealingly clamped to the die body by a retainer bar whereas each leg is free to flex to pivot the lips with respect to each other. Adjustment screws journaled in the die body vary the spacing between the feet of the lip members and pivot the lips about the flexible legs to produce a desired die orifice size and shape.

32 Claims, 3 Drawing Figures

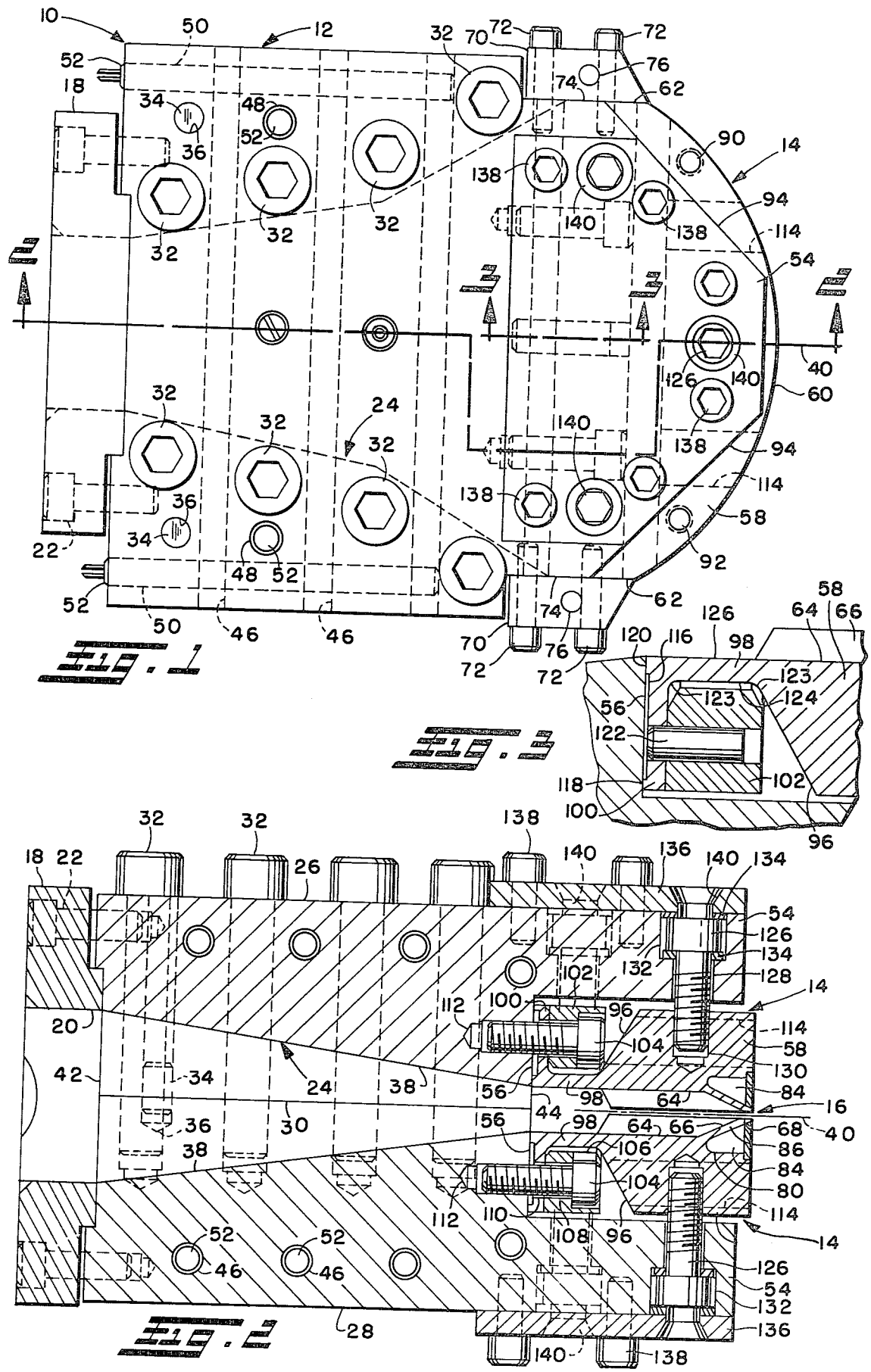

FOAM EXTRUSION DIE ASSEMBLY

FIELD OF THE INVENTION

This invention relates generally to extrusion die assemblies and more particularly to improvements in foam extrusion die assemblies of the type disclosed in applicant's U.S. Pat. No. 3,871,812, issued Mar. 18, 1975 and entitled "Foam Extrusion Die", and in applicant's U.S. Pat. No. 4,201,534, issued May 6, 1980 and entitled "Foam Extrusion Die Assembly".

BACKGROUND OF THE INVENTION

Applicant in his U.S. Pat. No. 3,871,812 disclosed a foam extrusion die assembly which facilitates obtaining the proper die orifice shape for a desired profile of an extruded product, e.g., foam boards, planks and logs. Applicant therein provided a die body to which were fastened two spaced, adjustable die lip members that extended axially outwardly from the face of the die body at the discharge end thereof. The die lip members had arcuate outer faces which together defined an elongated, axially outwardly extending, arcuate die orifice through which foaming material could move both laterally and axially outwardly relative to the lip members. The lip members were mounted on the die body for slight movement by a plurality of fasteners extending through oversized bores both in the body and lip members and were manipulable such that the die orifice may be opened or closed at the center thereof to correct the shape of the orifice to obtain the desired profile of the extruded product.

In his U.S. Pat. No. 4,201,534, applicant disclosed an improved foam extrusion die assembly. In this assembly, the lip members were mounted on the die body by centrally located screws for slight movement while toe and heel clamp assemblies fastened to the die body biased the lip members against the face of the die body for continuous sealing line contact with the die body face to preclude the undesirable passage of foaming material between the die body and lip members. Adjusting screws positioned forwardly and rearwardly of the centrally located screws engaged the outermost sides of the lip members and could be adjusted to obtain the desired profile of the extruded product.

Applicant more recently has made a further improvement in the extrusion die assembly disclosed in his U.S. Pat. No. 4,201,534. In this improvement, a small full width semicircular bead was provided on the inner or sealing face of each lip member to provide a somewhat better continuous line seal with the die body face and further to facilitate pivotal adjustment of the lip members.

SUMMARY OF THE INVENTION

This invention constitutes still further improvements in applicant's above-noted foam extrusion die assemblies. More particularly, this invention provides a foam extrusion die assembly that is easier to adjust and which has an improved seal between the adjustable lip members and main die body and greater mechanical integrity.

According to this invention, a foam extrusion die assembly comprises a die body and a pair of spaced cantilevered die lip members each secured at one end to the die body. The lip members at their other or suspended ends have opposed lips defining an arcuate die orifice therebetween, and adjustment means are provided for flexing the cantilevered lip members to vary the size and shape of the die orifice In addition, and importantly, other adjustment means are provided for adjusting such one ends of the lip members towards and away from each other further to vary the size and shape of the die orifice.

More particularly, the foam extrusion die assembly comprises a die body having an extrudate passage terminating at an opening in a face of the die body, and a pair of spaced cantilevered lip members extending axially outwardly from the die body face at opposite sides of the opening. The lip members have opposed inflexible arcuate lips defining an elongated, arcuate die orifice through which foaming material moves both laterally and axially outwardly relative to the lips. Each lip member further has an axially extending flexible chordal leg and a foot at the end of the leg opposite the die lip. Each foot is adjustably and sealingly clamped to the die body at the face thereof by a full width retainer or clamp bar for adjustment perpendicularly to the extrusion plane defined by the lips, whereas the leg of each lip member is free to flex to pivot the lips with respect to each other. That is, the chordal leg acts as a hinge between the lip and foot of each lip member which permits pivoting of the former with respect to the latter. Positive adjustment means are provided for adjusting the spacing between the feet and for pivoting the lips about the flexible chordal legs. Adjustment at the feet mainly opens or closes the arcuate die orifice at the ends thereof whereas flexing of the lip members about the flexible legs opens or closes the lips mainly at the center thereof. Accordingly, the die orifice shape may be easily and precisely adjusted to obtain a desired profile of the extruded product, while the die lip members are fixedly and sealingly secured to the die body.

Further in accordance with this invention, each lip member generally is in the form of a plate and a deep groove is provided therein at its outermost surface to form the flexible leg and foot thereof. The retainer bar is accommodated in the groove and fixed to the foot for common adjustment by means of adjusting screws threaded into the retainer bar. The heads of the adjusting screws are journaled in axially projecting end portions of the die body whereupon rotation of the adjusting screws positively drives the foot towards or away from the other foot. Similar adjustment screws for the lips positively drive the lips towards or away from the other to effect pivoting thereof about the flexible legs.

Still in accordance with this invention, the foot of each lip member has full width, axially extending heel and toe projections on its axially inner or sealing face. The heel and toe projections are urged into tight sealing and sliding engagement with the die body face by the retainer bar to provide a pair of spaced high pressure seals between each lip member and die body that preclude the passage of foaming material therebetween. Both pairs of seals are continuously maintained through adjustment of the lip members. Moreover, the back of the heel is flush with the interior of the lip members to provide a smooth flow path.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a top plan view of an extrusion die assembly in accordance with this invention;

FIG. 2 is a longitudinal vertical section through the die assembly of FIG. 1 taken substantially along the line 2—2 thereof; and FIG. 3 is an enlarged partial vertical section through the die assembly of FIG. 1 taken substantially along the line 3—3 thereof.

DETAILED DESCRIPTION

Referring now in detail to the drawing, a preferred form of foam extrusion die assembly in accordance with this invention is indicated generally by reference numeral 10 and comprises a main die body 12 and a pair of adjustable die lip members 14. The die lip members 14 are connected to the die body 12 at its discharge end and together define a gap or die orifice 16 which may be varied in shape in a manner to be subsequently described. The die body 12 may be secured by suitable means at its receiving end to a supply source for foaming material, such as to the discharge portion of a screw barrel of a conventional extruder. The extruder is not shown as its construction is well known to those skilled in the art. A suitable adaptor plate 18 having material shaping passage 20 may be attached by suitable fasteners 22 to the die body 12 between the same and the source for shaping the foaming material and directing it into a longitudinally extending, flow shaping passage 24 in the die body 12.

The die body 12 may be integrally formed, but preferably consists of a top half 26 and a bottom half 28. The die body halves 26 and 28 are secured together in mating contact at their mating faces 30 by two series of longitudinally spaced fasteners 32. To assure proper alignment of the upper and lower die body halves when assembled, guide pins 34 and guide holes 36 therefor are provided respectively in the top and bottom die body halves. The die body halves are of similar construction and for ease in description, corresponding elements thereof will be referred to hereinafter by the same reference numerals.

The top and bottom die body halves 26 and 28 include interfacing channels 38 having sloped bottoms and sides which together cooperate to form the flow shaping passage 24. The flow shaping passage 24 preferably is symmetrical along the longitudinal or die axis 40 and progressively increases in width and decreases in height from its inlet opening 42 to its outlet opening 44 which is substantially rectangular in shape. It will be appreciated that the shaping passage 24 shapes the foaming material to a desired rectangular profile for discharging the same between the die lip members 14 mounted adjacent and top and bottom the outlet opening 44. Moreover, the shaping passage 24 provides for a minimum amount of expansion of the foaming material passing therethrough because the cross-sectional area thereof is substantially the same along the length of the die body portion 12. If desired, the top and bottom die body halves 26 and 28 may include transversely extending bores 46, vertically extending bores 48 and axially extending bores 50 into which cartridge heaters 52 or the like may be inserted so that the foaming material may be heated as it flows through the die body 12.

The top and bottom die body halves 26 and 28 at the discharge end of the die body 12 each further have an end projection 54 of truncated triangular shape. The end projections 54 are equally vertically spaced from the die axis 40 and extend axially beyond inwardly disposed, accurately machined end faces 56 of the die body halves. The end faces 56 extend vertically and hence perpendicularly to the die axis 40. The lip members 14 are positioned between the end projections of the die body halves and extend generally axially outwardly from the end faces 56.

The lip members 14, which have a plate-like shape and are oppositely facing, each have an axially outer lip or lip portion 58. As viewed from the top (see FIG. 1), each lip 58 can be seen to be substantially in the form of a minor segment of a circle and has an arcuate axially outer face 60 that terminates at the axially extending side faces 62 of the lip members. Each lip further has, at its vertically innermost side, a palate-shape cavity 64. Each cavity 64 has a smoothly sloping arcuate surface 66 that slopes from the bottom of the cavity to the perimeter of the lip 58 at its outer face 60. At the intersections of the sloping surfaces 66 and the outer faces 60 is a die land 68 which may be flattened to any desirable degree. The die lands 68 of the lips together define therebetween the top and bottom edges of the gap or die orifice 16.

The ends of the die orifice 16 are defined by choker bars 70 which are secured by suitable fasteners 72 to the die body at opposite sides thereof at recessed shoulders 74. The choker bars 70 span the gap between the lip members 14 and are in sliding contact with the side faces 62 of the lip members. Accordingly, the choker bars additionally serve to maintain the lip members 14 in vertical alignment and restrain them against lateral movement, while permitting adjustment of the lip members towards or away from each other. As desired, the choker bars may have vertical bores 76 therein into which cartridge heaters or the like may be inserted for heating purposes.

As best seen in FIG. 2, each lip 58 further has an arcuate channel 80 which opens axially outwardly to the arcuate outer face 60 of the lip and extends substantially the arcuate length thereof. An elongate, narrow, closure strip 82 is recessed in the outer face 60 of each lip and closes the channel 80 to form a passage 84 through which heating and cooling media may be circulated. Sealing welds may be provided to secure the closure strip in place and to seal against leakage.

It should be noted that the vertically inner surface of each groove 80 is uniformly and closely spaced from the corresponding smoothly sloping surface 66. Accordingly, only a thin wall 86 separates the passage 84 from the cavity 64 in each lip 58. In this manner, the temperature of the foaming material passing between the lips 58 at the critical discharge area thereof may be precisely controlled.

Heating and cooling media is circulated through the passages 84 via inlet and outlet supply passages 90 and 92 in the lips 58. The supply passages communicate respectively with opposite ends of the passages 84 and open to the vertically outermost sides of the lips. As seen in FIG. 1, the supply passages are outwardly offset from the sloping side faces 94 of the die body end projections 54 so that flexible supply tubes or the like may be coupled to the supply passages.

In FIG. 2, each lip member 14 can be seen to have a deep transversely extending groove 96 in its vertically outermost side which extends chordally with respect to the subtended arc of the die lips 58. The grooves 96 extend the full width of the lip members and form or define the thin flexible legs 98 and feet 100 of the lip members, as well as the die lips 58. The flexible legs 98 extend axially inwardly from the die lips 58 whereas the feet 100 extend vertically outwardly from the ends of the legs.

The feet 100 are clamped to the die body 12 at the die body faces 56 by clamp or retainer bars 102 and clamp screws 104. Two such clamp screws 104 are provided at opposite ends of each retainer bar 102. The heads of the clamp screws are recessed in slots 106 in the axially outer sides of the retainer bars, whereas the shanks of the clamp screws extend through bores 108 and 110 respectively in the retainer bars and feet and are threadedly received in axial bores 112 in the die body faces 56. Access bores 114 aligned axially with the clamp screws 104 are provided in the lips 58 so that the clamp screws can be engaged and rotated by an appropriate tool. With the clamp screws 104 tightened, the retainer bars 102 urge the axially inner or sealing faces 116 of the feet into pressure engagement with the corresponding die body faces 56.

As best seen in FIG. 3, such axially inner or sealing faces 116 of the feet 100 each has transversely extending, full width toe and heel projections or seals 118 and 120 which are located respectively at the vertically outer and inner ends of the respective foot. The axial end face of each such projection is accurately machined for sealing and sliding engagement with the opposed accurately machined die body face 56. Accordingly, the toe and heel projections provide two spaced, continuous high pressure seals between each lip member and the corresponding die body face.

To ensure a tight seal across the full width of the feet 100 and die body faces 56 at the heel and toe projections 118 and 120, the retainer bars 102 extend the full width of the feet and preferably are as large as possible such that they constitute a rigid clamping element. However, the retainer bars preferably are fully contained within the grooves 96 as seen in FIGS. 2 and 3. This minimizes the vertical spacing between the die body end projections 54 required to accommodate the lip members and retainer bars thereby giving the extrusion die a low profile at its discharge end. It also should be noted that the axially inner ends of the retainer bars are sufficiently spaced from the flexible legs 98 and may have chamfers at the edges thereof so as not to interfere with the bending or flexing of the legs through a desired range.

Still referring to FIG. 3, it can be seen that each retainer bar 102 is fixed to its corresponding foot 100 by means of dowel pins 122. The dowel pins are press or closely fitted in aligned bores in the feet and retainer bars. There should be at least two dowel pins for each retainer bar and foot. For example, three pins may be provided for each retainer bar and foot, one at the middle and one at each end thereof. Other means of fixing the retainer bars and feet together for common vertical adjustment in the manner described hereinafter may be utilized such as by welding the retainer bars to the feet.

With the feet 100 securely and sealingly clamped to the die body in the aforedescribed manner, the die lips 58 are supported on or suspended from the die body 12 in cantilevered manner by the flexible legs 98 and feet 100. Because the lips essentially constitute a nondeformable or inflexible body because of their substantially greater thickness than the legs, it should be apparent that flexing or bending of the flexible legs will pivot the die lips about the flexible legs. That is, the flexible legs to the rear of the lips enable the lips to be pivoted along the flexing legs. Accordingly, the angular inclination of the lips with respect to one another may be varied. In doing so, the die orifice may be opened or closed more or mainly at the center thereof than at its ends to define an arcuate concave or convex die orifice to obtain a desired profile of the extruded product.

The desired flex of the flexible legs 98 may be obtained by varying their thickness and axial length. As seen in FIG. 3, the axial length of each leg is the tangent-to-tangent distance between the inner radiused corners 122 of the corresponding groove 96. The thickness of each leg is the distance between the bottom 124 of the groove and the vertically inner surface 126 of the leg, which bottom 124 and surface 126 preferably are parallel to one another. The inner surface 126 of each leg also preferably is flush with the bottom of the cavity 64 of each lip 58 so that it essentially constitutes a continuation thereof. In addition, the inner surface or back of the heel projection 120 is flush with the inner surface 126. This provides a smooth flow path from the die passage outlet 44 to the passage defined between the cavities 64. It also should be noted that the retainer bars 102 may be spaced from the flexible legs such that they limit maximum flexing or bending of the legs to within their elastic limit. In this manner, the legs may be prevented from being overflexed resulting in plastic deformation thereof which then would require replacement of the thusly damaged lip members.

The angular positions or inclinations of the die lips 58 are positively controlled by lip adjustment screws 126. A lip adjustment screw 126 is provided for each die lip. The shank of each lip adjustment screw passes freely through a bore 128 in the corresponding die body end projection 54 and is threadedly received in a bore 130 in the corresponding lip 58. The bores 130 preferably are centrally located in the lips 58. The heads of the lip adjustment screws are journaled in counterbores 132 that open to the vertically outermost sides of the end projections 54. Each lip adjustment screw head is journaled between thrust washers 134 and the heads and thrust washers are maintained in assembled relationship within the counterbores 132 by retaining plates 136. The retaining plates 136 are secured to the end projections 54 by suitable fasteners 138. Access bores 140 are provided in the retaining plates 136 in vertical alignment with the heads of the lip adjustment screws 126 so that an appropriate adjustment tool or element may be engaged with the lip adjustment screws. An adjustment element such as a stub shaft, and associated remote adjustment assembly, is shown and described in applicant's U.S. Pat. No. 4,201,534. Rotation of the lip adjustment screws will thread the same into or out of the die lips 58 thereby driving the die lips vertically outwardly or inwardly, respectively. Such movement of the die lips will cause the same to pivot about the flexible legs 98 thereby to open and close the die orifice substantially more at the center thereof than at the ends.

While the lip adjustment screws 126 generally control the pivoting of the lip members 58, foot adjustment screws 140 adjust the vertical spacing between the feet 100 of the lip members 14. As seen in FIG. 2, the foot adjustment screws 140 are disposed in the end projections 54 in a manner similar to the lip adjustment screws 126. However, the shanks of the foot adjustment screws are threadedly received in vertical bores in the retainer bars 102. Two such foot adjustment screws 140 are provided for each retainer bar at the opposite ends thereof as seen in FIG. 1. By rotating the foot adjustment screws, the same will drive the retainer bars, and hence the feet coupled thereto, vertically inwardly or outwardly to vary the spacing between the feet. It should be noted that the counterbores 106 and bores 108 and 110 in the retainer bars and feet are oversized in at least their vertical dimension so that the retainer bars and feet can be vertically adjusted in this manner.

It can now be seen that the vertically spaced lip members 14 provide an axially outwardly extending die orifice 16 which permits the foaming material to move both laterally and axially outwardly therethrough thus facilitating expansion of the foaming material in all directions simultaneously. Moreover, the die orifice opening can be adjusted by manipulating the lip members to obtain the desired profile or shape of the extruded product. If a foam board, for example, is too thin or too thick in the center thereof, the die lips may be adjusted to vary their relative angular inclination to close the gap more in the center than at the ends or to open the gap more in the center, respectively. This adjustment is made by lip adjustment screws 126 which pivot the lips about the flexible legs 98. If, on the other hand, the foam board is too thin or too thick at its sides, the spacing between the feet 100 may be increased or decreased by the foot adjustment screws 140 to open or close the gap mainly at the ends thereof. Considered another way, the die orifice size at the ends thereof is mainly controlled through adjustment of the spacing between the feet of the lip members while the die orifice size at its center is mainly controlled by pivoting the die lips about the flexible legs.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

The embodiments of the invention in which an exclusive property or privilege is claimed are defined as follows:

1. A foam extrusion die assembly comprising a die body, a pair of spaced cantilevered die lip members each secured at one end to said die body and having at their other ends opposed inflexible die lips which together define an arcuate die orifice, and adjustment means for flexing said die lip members at a chordal flexing portion to the rear of said die lips to vary the shape and size of the die orifice.

2. The assembly of claim 1 further comprising means for adjusting said one end of each lip member towards and away from the other.

3. The assembly of claim 1 wherein said one end of each lip member has a foot and a flexible leg interconnecting said foot and the corresponding die lip.

4. The assembly of claim 3 further comprising means for clamping each foot to said die body.

5. The assembly of claim 4 wherein said means for clamping includes a rigid clamp bar for each foot.

6. The assembly of claim 5 wherein each foot extends the width of the lip member and said clamp bar extends the width of the foot.

7. The assembly of claim 5 wherein each lip member has a groove therein forming its leg and foot, and said clmp bar is accommodated in said groove.

8. The assembly of claim 6 wherein said means for clamping further includes at least one fastener securing each clamp bar to said die body, and said lips each have an axially extending access passage aligned with the corresponding fastener.

9. The assembly of claim 4 wherein said adjustment means includes a lip adjustment screw for each lip, each lip adjustment screw having a head journaled in said die body and a shank threadedly received in a bore in the lip.

10. The assembly of claim 9 further comprising means for adjusting each foot towards and away from the other.

11. The assembly of claim 10 wherein each foot and corresponding clamp bar are fixed for common adjustment towards and away from the other foot and clamp bar, and said means for adjusting each foot includes foot adjustment screws, each foot adjustment screw having a head journaled in said die body and a shank threadedly received in a bore in the corresponding clamp bar.

12. The assembly of claim 4 wherein said die body has a die body face and each foot has full width heel and toe projections in sealing engagement with said die body face.

13. The assembly of claim 12 wherein said projections are slidable along said die body face so that the spacing between the feet can be varied while continuously maintaining such sealing engagement.

14. The assembly of claim 1 wherein said die body has a die body face and said one end of each lip member has a sealing face opposed to said die body face and in sealing engagement therewith.

15. The assembly of claim 14 wherein said sealing face has two spaced full width projections in sealing engagement with said die body face.

16. An extrusion die assembly comprisingg a die body, a pair of spaced lip members having opposed arcuate lips defining an orifice therebetween, each lip member further having an axially extending flexible leg to the rear of said arcuate lip and a foot at each end of said leg opposite said lip, and means for adjustably securing each foot to said die body and for pivoting each lip about its flexible leg to provide a desired die orifice size and shape, said means for pivoting including lip adjustment means engaged with said lips for positively driving said lips both towards and away from one another thereby to cause said lips to pivot about the flexing legs so as to vary both the size and shape of the orifice.

17. The assembly of claim 16 wherein said die body has a die body face extending perpendicularly to the die axis, and said means for adjustably securing includes means for clamping each foot to said die body face in sliding and sealing engagement therewith.

18. The assembly of claim 17 comprising foot adjustment means for positioning the feet by sliding the feet along said die body face.

19. An extrusion die assembly comprising a die body having an extrudate passage terminating at an opening, a pair of spaced lip members at opposite sides of said opening, said lip members each having a lip, a flexible leg extending axially inwardly from said lip and a foot at the end of said flexible leg opposite said lip, said lips having opposed arcuate faces which define an extrusion die orifice therebetween, means for securing each foot to said die body, means for flexing said leg portions to pivot the lips thereabout to open or close the die orifice mainly at the center, and means for adjusting the spacing between the feet to open or close the die orifice mainly at the ends thereof.

20. The assembly of claim 19 wherein said lips and legs have flush inner sides defining a smooth flow path from said opening to said die orifice.

21. The assembly of claim 19 wherein each lip has as its inner side a smoothly sloping arcuate surface terminating at the arcuate face of the lip and an arcuate heating and cooling passage adjacent said arcuate face and arcuate surface, said passage having an inner wall closely spaced and parallel to said arcuate surface.

22. A foam extrusion die assembly comprising a die body having closely spaced end extrusions, a pair of plate-like lip members located between said end extensions and having opposed arcuate lips defining a die orifice therebetween, each lip member having a deep groove therein to the rear of the arcuate lips defining a thin flexible leg interconnecting opposite ends of such lip member, one end of each lip member having said lip, and means contained within said groove for clamping the other end of each lip member to said die body.

23. The assembly of claim 20 wherein said means for clamping includes a retainer bar for each of said one end and means for securing said retainer bar to said die body with the corresponding said one end clamped between said retainer bar and die body.

24. The assembly of claim 20 wherein said means for securing includes at least one screw fastener, and said lip has an access passage therethrough for said fastener.

25. An extrusion die assembly comprising a die body having a die body face and an extrudate passage in said body terminating at an opening in said face, a pair of spaced lip members extending outwardly from said die body face at opposite sides of said opening, said lip members each having a lip defining with the other lip an arcuate die orifice, a flexible leg extending axially inwardly from said lip and a foot at the end of said flexible leg opposite said lip, said foot having a face opposing said die body face and toe and heel projections extending axially from said face, means for securing said foot to said die body and for maintaining said heel and toe projections in sliding sealed engagement with said die body face, and foot adjustment means for adjusting the spacing between said feet while said heel and toe projections are maintained in such sliding sealed engagement with said die body face.

26. The assembly of claim 16 wherein said lip adjustment means comprises at least one adjustment screw for each lip, said one adjustment screw having a head journaled in said die body and a shank threadedly received in a bore in the lip, whereby rotation of said one adjustment screw drives the lip along said shank for positively adjusting the position and angular relationship of the lip with respect to the opposed lip.

27. A foam extrusion die for extruding boards, planks, billets and the like comprising a die body, and a pair of die lip members including feet adjustably yet fixedly secured to said die body, each member having inflexible arcuate die lips defining an orifice, and a chordal flexing portion to the rear of said die lips to enable said lip members to be pivoted along said flexing portion to define an arcuate concave or convex die orifice.

28. An extrusion die as set forth in claim 27 wherein said inflexible arcuate die lips are substantially in the form of a minor segment of a circle.

29. An extrusion die as set forth in claim 27 wherein said inflexible die lips are substantially in the form of a chordal segment of a circle defined by said flexing portion and the subtended arc.

30. An extrusion die as set forth in claim 27 wherein said feet each includes a heel and toe adjustably clamped to a surface of said die body extending normal to the axis of the die.

31. An extrusion die as set forth in claim 30 wherein the back of said heel is flush with the interior of said die lip member.

32. An extrusion die as set forth in claim 27 wherein said feet each includes a heel flush with the interior of said die lip member.

* * * * *